United States Patent
Salnikov et al.

(10) Patent No.: US 12,180,396 B2
(45) Date of Patent: Dec. 31, 2024

(54) MULTI-PHASE ADHESIVE ARTICLES AND METHODS THEREOF

(71) Applicant: 3M INNOVATIVE PROPERTIES COMPANY, St. Paul, MN (US)

(72) Inventors: Dmitriy Salnikov, Woodbury, MN (US); Kristin L. Thunhorst, Stillwater, MN (US); Nathan L. Gergen, Hudson, WI (US); Henrik B. van Hengerich, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 266 days.

(21) Appl. No.: 17/638,534

(22) PCT Filed: Aug. 21, 2020

(86) PCT No.: PCT/IB2020/057866
§ 371 (c)(1),
(2) Date: Feb. 25, 2022

(87) PCT Pub. No.: WO2021/059050
PCT Pub. Date: Apr. 1, 2021

(65) Prior Publication Data
US 2022/0403209 A1    Dec. 22, 2022

Related U.S. Application Data

(60) Provisional application No. 62/905,677, filed on Sep. 25, 2019.

(51) Int. Cl.
*B32B 3/08*    (2006.01)
*C09J 7/10*    (2018.01)

(52) U.S. Cl.
CPC .................. *C09J 7/10* (2018.01); *B32B 3/08* (2013.01); *C09J 2301/208* (2020.08); *C09J 2301/21* (2020.08); *C09J 2301/312* (2020.08)

(58) Field of Classification Search
CPC .... B32B 3/14; B32B 3/18; B32B 3/22; B32B 3/085
See application file for complete search history.

(56) References Cited

U.S. PATENT DOCUMENTS 5,585,178 A    12/1996    Calhoun
5,593,759 A    1/1997    Vargas
(Continued)

FOREIGN PATENT DOCUMENTS

CN    104449538    3/2015
DE    102006026538    12/2007
(Continued)

OTHER PUBLICATIONS

International Search Report for PCT International Application No. PCT/IB2020/057866, mailed on Nov. 20, 2020, 4 pages.

*Primary Examiner* — Elizabeth E Mulvaney
(74) *Attorney, Agent, or Firm* — Philip P. Soo

(57) ABSTRACT

Provided are adhesive articles and related methods of making and use. The adhesive article includes one or more patterned adhesive layers comprising compositionally and spatially distinct adhesives that are laterally disposed relative to each other. The first and second adhesives are optionally capable of being functionally cured to provide a structural adhesive bond with a substrate. These adhesives can provide high fracture toughness and high modulus characteristics not otherwise possible in a homogeneous adhesive composition. These adhesives can provide some degree of crack arrestment and significantly reduce the need for mechanical fasteners in industrial bonding applications.

13 Claims, 6 Drawing Sheets

(56) References Cited

U.S. PATENT DOCUMENTS

| | | |
|---|---|---|
| 5,738,939 A | 4/1998 | Calhoun |
| 6,159,544 A | 12/2000 | Liu |
| 6,423,140 B1 | 7/2002 | Liu |
| 7,753,312 B2 | 7/2010 | Schmidt |
| 8,491,749 B2 | 7/2013 | Gorodisher |
| 8,618,204 B2 | 12/2013 | Campbell |
| 9,517,614 B1 | 12/2016 | Cavallaro |
| 9,765,240 B2 | 9/2017 | Rattray |
| 2002/0108564 A1 | 8/2002 | Gruenewald |
| 2006/0060135 A1 | 3/2006 | Rankin, Jr. |
| 2006/0062889 A1 | 3/2006 | Houston |
| 2006/0093775 A1 | 5/2006 | Konig |
| 2006/0234014 A1 | 10/2006 | Liu |
| 2008/0000577 A1 | 1/2008 | Vichniakov |
| 2008/0251201 A1 | 10/2008 | Sikkel |
| 2009/0162595 A1 | 6/2009 | Ko |
| 2010/0233424 A1 | 9/2010 | Dan-Jumbo |
| 2011/0024039 A1 | 2/2011 | Campbell |
| 2011/0249376 A1 | 10/2011 | Wu |
| 2015/0108208 A1 | 4/2015 | Nash |
| 2016/0137885 A1 | 5/2016 | Maier |
| 2016/0376471 A1 | 12/2016 | Barrios |
| 2017/0136737 A1 | 5/2017 | Zaddack et al. |
| 2017/0239929 A1 | 8/2017 | Cobb |

FOREIGN PATENT DOCUMENTS

| | | | |
|---|---|---|---|
| EP | 1084204 | | 3/2001 |
| EP | 2072595 | | 6/2009 |
| FR | 2822159 | | 9/2002 |
| FR | 2822159 A1 | * | 9/2002 |
| JP | 3338693 | | 11/2001 |
| JP | 2003259787 | | 9/2003 |
| JP | 2012-139974 | * | 7/2012 |
| TW | 467769 | | 12/2001 |
| WO | WO 1994-08781 | | 4/1994 |
| WO | WO 2009-126862 | | 10/2009 |
| WO | WO 2010-011705 | | 1/2010 |
| WO | WO 2010-011710 | | 1/2010 |
| WO | WO 2010-039614 | | 4/2010 |
| WO | WO 2010-104741 | | 9/2010 |

* cited by examiner

MULTI-PHASE ADHESIVE ARTICLES AND METHODS THEREOF

CROSS REFERENCE TO RELATED APPLICATIONS

This application is a national stage filing under 35 U.S.C. 371 of PCT/IB2020/057866, filed 21 Aug. 2020, which claims the benefit of U.S. Provisional Patent Application No. 62/905,677, filed 25 Sep. 2019, the disclosure of which is incorporated by reference in its/their entirety herein.

FIELD OF THE INVENTION

The present disclosure relates to adhesive articles and assemblies, along with related methods of making and use. The adhesive articles can be useful, for example, in aerospace, automotive, and other industrial bonding applications.

BACKGROUND

As vehicle manufacturers seek better and more efficient ways of making their products, adhesives have gained wide acceptance in high performance bonding applications. Structural adhesives can bond dissimilar materials, support high weight loads, resist fatigue, and uniformly distribute stresses along a bond interface. Adhesives are also lightweight and are corrosion resistant. Unlike fasteners such as screws and rivets, adhesives do not perforate a substrate, making them suitable for joining hollow and thin-walled components such as aerospace honeycomb composites. Eliminating fasteners can also improve aesthetics, reduce or distribute stress concentrations, reduce susceptibility to corrosion, and provide wider design possibilities.

Despite the above advantages, regulatory requirements sometimes lead manufacturers to bond joints using a combination of adhesives and fasteners. For example, in the aerospace field, bonding solutions used on aircraft must be certified to demonstrate airworthiness. Achieving such certification can be a significant technical challenge. In the United States, the Federal Aviation Administration (FAA) sets forth only three methods to establish airworthiness of a bonded joint.

The first method of compliance is to incorporate crack arrestment features such that limit load can be carried with debonding between arrestment features. Such features typically include fasteners such as screws or rivets. The second method is proof testing of each production article that will apply critical limit design load to each critical bonded joint. This second method can be used to the extent that the sizing and loading of the bonded structures makes such testing feasible. The third method of compliance is repeatable and reliable nondestructive inspection techniques that establish and ensure the strength of the each joint.

SUMMARY

Prior approaches to bonding primary structures involved adhesive solutions with high fracture toughness and inclusion of mechanical rivets to provide crack arrestment. Here, macroscale multi-phase structural film adhesive systems are provided, which enable inclusion of two or more traditionally counter-balancing properties within one adhesive article.

Advantageously, the multi-phase adhesives described herein can provide crack arrestment within the adhesive itself. Use of a combination of adhesives enables a broader temperature range of operation for both high fracture toughness characteristics to retard crack propagation once initiated and high modulus characteristics to resist crack initiation in the first place, even when these properties cannot be achieved in any one adhesive. By significantly improving crack arrestment, these adhesives present a bonding solution that could enable manufacturers to eliminate or significantly reduce use of mechanical fasteners.

Multi-phase adhesive systems notably provide both performance and handling benefits which have been traditionally considered mutually exclusive properties. In its simplest form, the multi-phase adhesives can be envisioned as a single, striped layer of two distinct adhesives with defined phase boundaries. These adhesive systems are not so limited, however, and can assume patterns and geometries tailored for the application at hand. Adhesive systems containing three or more adhesives and/or multiple layers are possible, and patterning can be conceptualized in any of a variety of two-dimensional and three-dimensional spaces.

In a first aspect, an adhesive article is provided. The adhesive article comprises: a first patterned adhesive layer comprising first and second adhesives that are compositionally and spatially distinct, and laterally disposed relative to each other within the first patterned adhesive layer; wherein the first and second adhesives are each capable of being functionally cured to provide, collectively, a structural adhesive bond with a substrate.

In a second aspect, an adhesive article is provided, comprising: a first patterned adhesive layer comprising first and second adhesives that are compositionally and spatially distinct, and laterally disposed relative to each other within the first patterned adhesive layer; and a second patterned adhesive layer disposed on the first patterned adhesive layer and comprising third and fourth adhesives that are compositionally and spatially distinct, and laterally disposed relative to each other within the second patterned adhesive layer, wherein first and second patterned adhesive layers have respective patterns that do not substantially coincide with each other when viewed from a direction perpendicular to the first and second patterned adhesive layers.

In a third aspect, an adhesive assembly is provided, comprising the adhesive article disposed on a substrate or release liner.

In a fourth aspect, a method of making an adhesive assembly, the method comprising: applying a first adhesive onto a substrate; and applying a second adhesive onto the substrate, wherein the first and second adhesives that are compositionally and spatially distinct, and laterally disposed relative to each other within the substrate, and further wherein the first and second adhesives are capable of being functionally cured to provide, collectively, a structural adhesive bond with the substrate.

Figure 1:
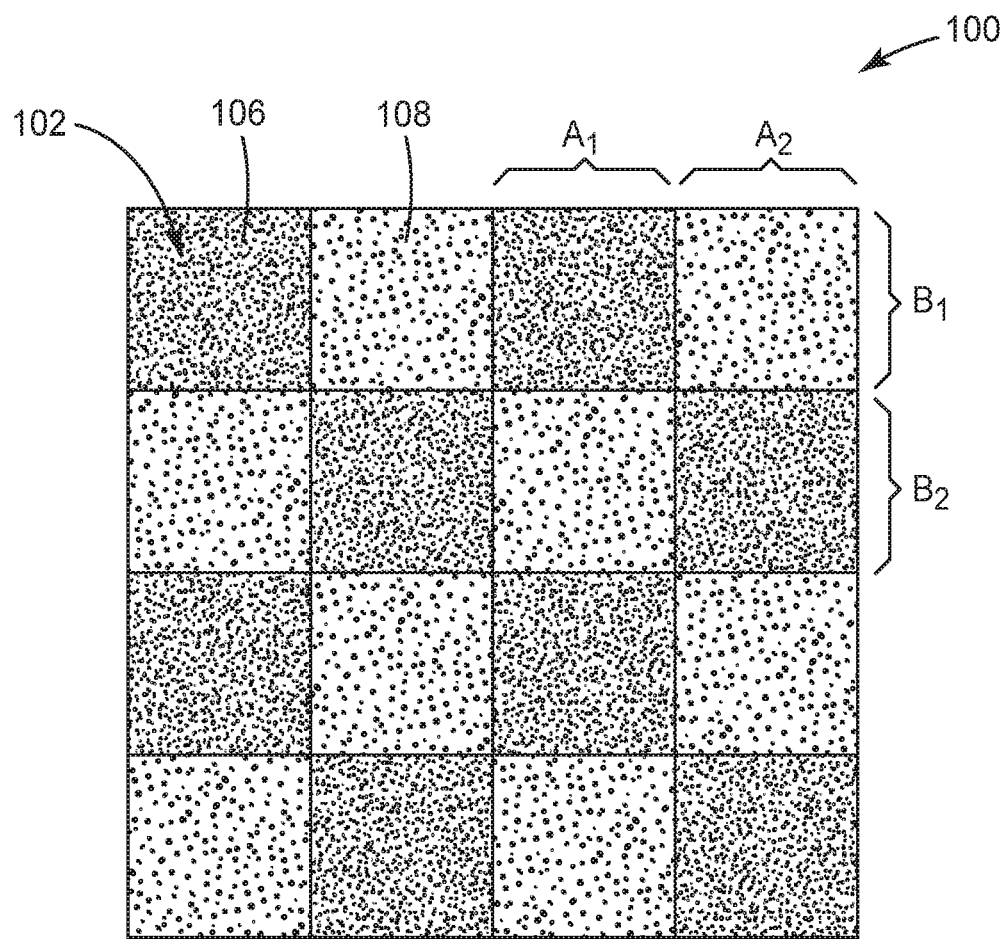
FIG. 1 is a top view of an adhesive article according to exemplary embodiment.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

As used herein:

"ambient temperature" means at 25±5° C.;

"average" means number average, unless otherwise specified;

"cure" means to cause a hardening or an increase in viscosity through a physical or chemical reaction, such as by exposure to electromagnetic radiation or heating;

"differential scanning calorimetry" refers to a thermoanalytical technique in which the difference in the amount of heat required to increase the temperature of a sample and reference is measured as a function of temperature.

"fiber" means a thread or filament that could be either continuous or discrete in nature;

"functionally cured" means cured to an extent at which the cured material can be used in its intended application— in some embodiments, this reflects at least a 90% degree of cure as determined by differential scanning calorimetry (i.e., observing an initial integrated heat flow (enthalpy of reaction) in a first scan and achieving an integrated heat flow (remaining enthalpy of reaction) less than 10% of the initial enthalpy of reaction in a second scan);

"laterally" means at, toward, or from the sides (i.e., within the same layer);

"polymer" means a relatively high molecular weight material having a molecular weight of at least 10,000 g/mol;

"substantially" means to a significant degree, as in an amount of at least 5 percent, 10, 20, 30, 40, 50, 60, 70, 80, 90, 95, 96, 97, 98, 99, 99.5, 99.9, 99.99, or 99.999 percent, or 100 percent; and "thickness" means the average distance between opposing sides of a layer or multilayer article when relaxed.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

An exposed major surface of a multi-phase adhesive article according to one exemplary embodiment is shown in FIG. 1 and herein designated by the numeral 100. An elevational side view of the adhesive article 100 is shown in FIG. 2.

Figure 2:
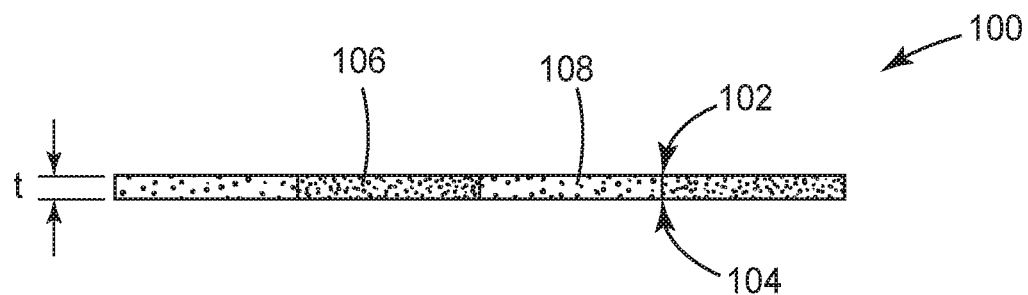
FIG. 2 is a side elevational view of the adhesive article of FIG. 1.

As presented in FIG. 2, the adhesive article 100 is comprised of a single layer having first and second opposed major surfaces 102, 104. The single layer is a patterned layer comprised of two different adhesives, a first adhesive 106 and a second adhesive 108. The adhesives 106, 108 are laterally disposed relative to each other and arranged according to a two-dimensional checkboard pattern shown in FIG. 1.

Optionally, the first and second adhesives 106, 108 are structural adhesives, or adhesives capable of being further cured to provide a structural adhesive bond with a suitable substrate. The bond may occur along one or both of the major surfaces 102, 104 of the adhesive article 100, with adhesion to one or more respective substrates.

A structural adhesive bond is generally considered to be an adhesive bond that provides an overlap shear strength when bonded between substrates and tested at room temperature of at least 1000 psi, or 6.9 megapascals (ASTM D1002). In addition to overlap shear strength, fracture strength is another important consideration in adhesively-bonded joint design, particularly in aerospace applications. Fracture strength may be determined according to a standard method such as ASTM D3433-00 (2012). In some embodiments, the structural adhesive bond provides a fracture strength of from 400 $J/m^2$ to 3000 $J/m^2$, from 700 $J/m^2$ to 3000 $J/m^2$, from 1000 $J/m^2$ to 1500 $J/m^2$, or in some embodiments, less than, equal to, or greater than 700, 800, 900, 1000, 1200, 1500, 2000, 2500, or 3000 $J/m^2$ at both −55° C. and 121° C.

The first and second adhesives 106, 108 have compositions that are substantially different from each other. The differences may be reflected in any of a variety of ways. For example, the first and second adhesives 106, 108 may have different individual fracture strengths and/or overlap shear strengths when cured separately and measured under identical conditions. While not critical in this configuration, the first adhesive 106 may have the greater fracture strength than the second adhesive 108, or vice versa.

In some embodiments, it can be advantageous for one adhesive to have a higher fracture strength at high temperatures and the other adhesive to have a higher fracture strength at low temperatures. For example, the first adhesive 106 can display a fracture strength greater than that of the second adhesive 108 at −55° C., which the second adhesive 108 can display a fracture strength greater than that of the first adhesive 106 at 121° C.

More generally, the first adhesive can display a fracture strength that is substantially different from that of the second adhesive in a range of temperatures from −55° C. to 121° C. In some embodiments, the first adhesive can display a fracture strength that is substantially greater than, or less than, that of the second adhesive over the entire temperature range from −55° C. to 121° C.

Similarly, the first and second adhesives 106, 108 may provide substantially different values of storage modulus, as measured on a dynamic mechanical analyzer at 25° C., amplitude of 15 micrometers, and a frequency of 1 Hz. In some embodiments, the first adhesive 106 can have a higher or lower storage modulus than the second adhesive 108, or vice versa, over all temperatures. In some embodiments, the first adhesive 106 can have a higher or lower storage modulus than the second adhesive 108, or vice versa, only above or only below a certain threshold temperature.

In some embodiments, the first adhesive 106 has an extent of dimensional expansion or contraction upon curing that is higher or lower than that of the second adhesive 108. In some embodiments, the first adhesive 106 is thermally conductive and the second adhesive 108 is thermally insulating. In some embodiments, the first adhesive 106 is electrically conductive and the second adhesive 108 is electrically insulating.

Either or both of the first and second adhesives 106, 108 may include a plurality of reinforcing fillers, such as reinforcing fibers. Suitable reinforcing fibers include, for example, carbon fibers or glass fibers.

For example, the first adhesive can be comprised of a plurality of first fibers embedded in a first curable composition and the second adhesive is comprised of a plurality of second fibers embedded in a second curable composition. Optionally, either the first or second adhesive 106, 108 is substantially free of any embedded reinforcing fibers.

If present, the plurality of first or second fibers can be present in an amount of from 1 percent to 90 percent, from 5 percent to 80 percent, from 10 percent to 75 percent, or in some embodiments, less than, equal to, or greater than 1 percent, 2, 5, 10, 15, 20, 25, 30, 35, 40, 45, 50, 55, 60, 65, 70, 75, 80, 85, or 90 percent by volume based on the overall volume of the respective first or second adhesive.

Either or both of the first and second adhesives 106 and 108 may include a nonwoven fibrous web, or the adhesives can be coated or deposited onto or laminated onto a nonwoven fibrous web, which can stabilize the adhesive film to improve handling characteristics prior to curing.

The first or second adhesive 106, 108 include respective curable compositions that can be cured using any known curing mechanism. The curing mechanism may be based on a thermal cure or exposure to actinic radiation. Actinic radiation can include light in the visible or ultraviolet light spectrum. If thermally curable, the first and second adhesives 106, 108 can have the same or different curing activation temperatures and/or curing kinetics.

Referring back to FIG. 1, the lateral dimensions of the first adhesive 106 are represented by lateral dimensions $A_1$ and $B_1$ and those of the second adhesive 108 are represented by lateral dimensions $A_2$ and $B_2$. This pattern is replicated throughout major surfaces of the adhesive article 100. The pattern illustrated here has a plurality of square regions in which dimensions $A_1$, $A_2$, $B_1$, and $B_2$ are equivalent, but this need not be the case.

For instance, dimensions $A_1$, $A_2$, $B_1$, and $B_2$ may each independently be from 0.5 millimeters to 50 millimeters, 3 millimeters to 25 millimeters, 6 millimeters to 15 millimeters, or in some embodiments, less than, equal to, or greater than 0.5 millimeters, 1, 2, 3, 4, 5, 6, 7, 8, 9, 10, 12, 15, 17, 20, 25, 30, 35, 40, 45, or 50 millimeters.

The layer comprised of the first and second adhesives 106, 108 has a thickness t as shown in FIG. 2. Thickness t is not particularly limited and can be from 25 micrometers to 500 micrometers, from 50 micrometers to 400 micrometers, from 100 micrometers to 250 micrometers, or in some embodiments, less than, equal to, or greater than 25 micrometers, 30, 35, 40, 45, 50, 60, 70, 80, 90, 100, 110, 120, 150, 175, 200, 225, 250, 275, 300, 325, 350, 375, 400, 425, 450, 475, or 500 micrometers.

In some embodiments, the thickness t can be different between that of the first and second adhesives 106, 108. Generally, this difference is preferably small. The first adhesive 106 is preferably not more than 2 percent, not more than 5 percent, not more than 10 percent, or not more than 15 percent thicker than the second adhesive 108 (and vice versa).

The first adhesive 106 and second adhesive 108 can independently represent any suitable weight fraction of the adhesive layer. For example, either of the first adhesive 106 and second adhesive 108 can be present in an amount of from 1 percent to 99 percent, from 15 percent to 85 percent, from 30 percent to 70 percent, or in some embodiments less than, equal to, or greater than 1 percent, 2, 5, 7, 10, 12, 15, 17, 20, 25, 30, 35, 40, 45, 50, 55, 60, 65, 70, 75, 80, 85, 90, 92, 95, or 99 percent by weight based on the overall weight of the adhesive layer.

Figure 3:
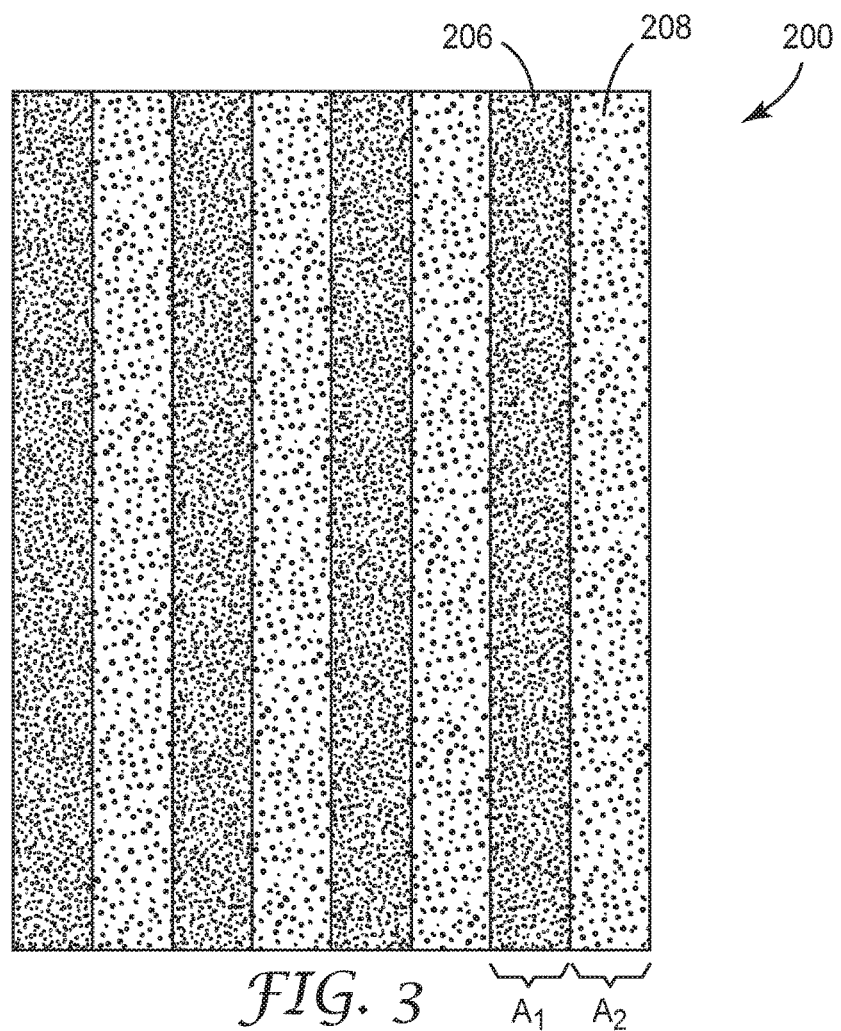
FIG. 3 is a top view of an adhesive article according to another exemplary embodiment.
Figure 4:
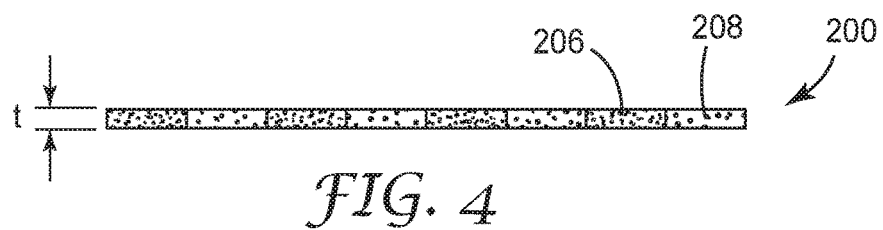
FIG. 4 is a side elevational view of the adhesive article of FIG. 3.

A second exemplary embodiment is shown in adhesive article 200 of FIGS. 3 and 4. FIG. 3 shows a striped pattern rather than a checkerboard pattern, characterized by stripe dimensions $A_1$ and $A_2$. As before, the dimensions $A_1$ and $A_2$ may be the same or different and can have any of the values enumerated with respect to the dimensions $A_1$, $A_2$, $B_1$, and $B_2$ in the immediately preceding paragraph. FIG. 4 shows the article 200 in an elevational side view, showing its single-layered construction. The article 200, as shown, has a thickness t that could have any of the thicknesses enumerated above with respect to the article 100.

Patterns used for the patterned adhesive layers need not be limited to those shown in FIGS. 1 and 3. Although not explicitly shown here, for example, the adhesive article could be characterized by a striped wave pattern similar to that shown in FIGS. 3 and 4 except that the stripes have a planar, yet curved, configuration as viewed from a direction perpendicular to the adhesive article.

Alternatively, the first and second adhesives could be arranged according to a grid pattern, in which one adhesive is continuous, extending from one side of the adhesive article to the other without interruption, and the other is discontinuous. In another embodiment, one adhesive can be disposed in the form of a plurality of randomly located islands, surrounded by a continuous matrix of the other adhesive within the same layer.

Figure 5:
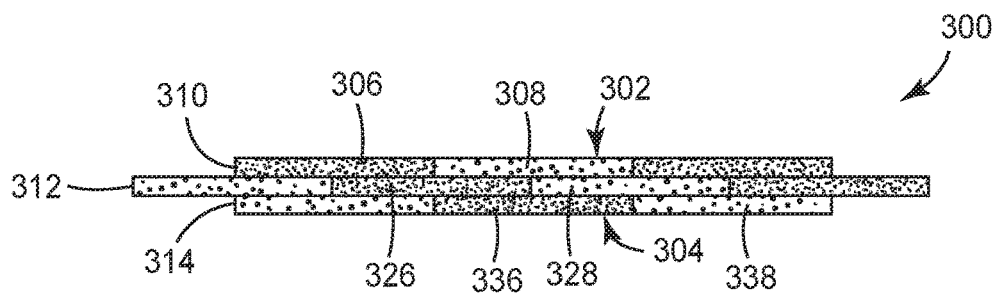
FIG. 5 is a side elevational view of an adhesive article according to another exemplary embodiment.

FIG. 5 illustrates an embodiment in which multiple single-layered adhesive articles (such as adhesive articles 100, 200) are laminated or otherwise disposed on top of one another to form a multi-layered adhesive article 300. In this exemplary embodiment, the article 300 has three discrete layers—a top layer 310 exposed along a first major surface 302, a middle layer 312 extending below the top layer 310, and bottom layer 314 extending below the middle layer 312 and exposed along a second major surface 304.

The top layer 310 is a patterned adhesive layer having first and second adhesives 306, 308, the middle layer 312 a patterned adhesive layer having third and fourth adhesives 326, 328, and the bottom layer 314 is a patterned layer having fifth and sixth adhesives 336, 338.

Optionally and as shown, the first adhesive 306, third adhesive 326, and fifth adhesive 336 are comprised of the same adhesive composition. Optionally and as shown, the second adhesive 308, fourth adhesive 328, and sixth adhesive 338 are comprised of the same adhesive composition.

Optionally and as shown, adjacent layers have similar or identical patterns with respect to each other. In the adhesive article 300 of FIG. 5, for example, the first and second adhesives 306, 308 exhibit the same pattern dimensions, periodicity, and thickness as the third and fourth adhesives 326, 328. Likewise, the third and fourth adhesives 326, 328 exhibit the same pattern dimensions, periodicity, and thickness as the fifth and sixth adhesives 336, 338. Each of the first, second, third, fourth, fifth, and sixth adhesive 306, 308, 326, 328, 336, 338 are structural adhesives.

Optionally and as shown, patterned adhesive layers that are adjacent to each other have respective patterns that do not coincide with each other when viewed from a direction perpendicular to the first and second patterned adhesive layers. For example, even if the adhesive pattern on one layer is similar or identical to that of an adjacent layer, the patterned adhesive layers display patterns that are offset and/or rotated relative to each other along a transverse direction. FIG. 5 shows how the misalignment of the patterns in adjacent layers provides phase boundaries between dissimilar adhesives not only along a given layer but also between layers (along a direction perpendicular to the adhesive layers).

The adhesive article 300 need not be limited to the layers shown. For example, any of the adhesive articles 100, 200, 300 may further include a continuous (i.e., non-patterned) adhesive layer. The continuous adhesive layer may be disposed on a major surface of the adhesive article 100, 200, 300 or disposed between two patterned adhesive layers thereof. Optionally, the continuous adhesive layer may be comprised of the same adhesive composition as one of the patterned adhesive layers.

Any of the provided adhesive articles may be provided with one or more release liners, which can be disposed on one or both exposed major surfaces of the adhesive article. Since there exposed surfaces can be tacky at ambient temperatures, such release liners can facilitate storage, transportation, and handling of these adhesive articles. The release liner is typically peeled from the adhesive article shortly before bonding.

Useful release liners can be comprised of nonwoven fibrous webs, thermoplastic films, or other polymer coated paper. The release liner can be coated with an optional material to provide release from the adhesive article. Suitable coatings are known in the art for use as structural adhesives. Examples of coatings include silicone, solvent and solventless types, thermal cure and radiation cure types, condensation cure types and addition cure types, epoxide functional, acrylate functional, silanol functional types, silicone hydride functional types, and release modifiers, such as siloxanes. In specific embodiments, the release coating is a silicone coating.

The multiphase constructions, as described here, can be used in bonding applications that require a high degree of adhesive toughness and ductility over a wide range of temperatures. The provided adhesive articles can overcome a particular shortcoming of existing structural adhesives. It was discovered that 250° F. cure temperature adhesives have high toughness and ductility but cannot withstand high temperature environments, while 350° F. cure temperature adhesives can handle high temperatures but display inferior toughness and ductility.

Other technical advantages that derive from having a multiphase structure on a macroscale level, as illustrated in FIGS. 1-5, relate more generally to achieving properties that tend to be mutually exclusive based on the composition of the adhesive. As an example, the provided multiphase adhesive can include domains of high structural strength in combination with domains of high thermal conductivity. In these embodiments, the structural adhesive provides a thermal conductivity of at least 0.2 W/m-K when functionally cured.

As another example, the provided multiphase adhesive can include domains of high structural strength and also domains with high vibration damping, or high structural strength and separate domains with high impact resistance. As yet another example, the provided multiphase adhesive can include domains of substantially different curing temperatures, where a first domain provides a bond at a relatively low temperature for quick fixation and a second domain enhances the strength of the bond at a relatively high temperature and is characterized by a relatively higher storage modulus and glass transition temperature ($T_g$).

Curing temperature for a given curable adhesive can be characterized, for example, by differential scanning calorimetry. In exemplary embodiments, the first adhesive phase has a peak exotherm temperature as measured by differential scanning calorimetry that is substantially different from that of the second adhesive phase.

The applicability of the provided adhesive articles are not restricted to aerospace and automotive bonding. In display material applications, demands exist for functional adhesives that have thermal or electrical conductivity and yet still meet adequate bond strength and bond reliability requirements. Thermally-conductive or electrically-conductive fillers used to impart these useful properties also tend to degrade adhesive performance, and the provided multiphase adhesive articles can confine these functions in separate adhesive domains.

Single-layered and multilayer adhesive articles can be made using any of a number of methods. The adhesive article can be disposed on a release liner or alternatively applied directly to a substrate. Methods of making these adhesive articles include continuous methods that are scalable, making them especially suited for an industrial manufacturing process. The two or more adhesives having substantially different compositions in the aforementioned adhesive articles can be applied simultaneously or sequentially. These methods can be used to obtain a bonded adhesive assembly comprised of the adhesive article disposed on, and structurally bonded to, a given substrate. Advantageously, suitable adhesives can be laid down using a software-controlled process, for example, a flexographic printing or inkjet printing process. If an inkjet process is used, an adhesive composition could be diluted in a solvent, printed, and later dried.

In a preferred embodiment, the provided adhesive article is applied to a substrate arranged into patterns using an automated tape laying (ATL) or automated fiber placement (AFP) process. Automated tape laying and automated fiber placement processes use computer-guided robotics to lay down one or several layers of tape or tows of fiber and adhesive onto a mold to create a part or structure. Typical applications include aircraft wing skins and fuselages. In other embodiments, the layups can be performed manually.

By their nature, an ATL or AFP process can be especially useful in laying down stripes of different adhesives as described in the foregoing. Advantageously, the stripes can be directly deposited onto substrates that have surfaces that are irregularly shaped or have compound curvatures. The stripes of adhesives may be applied at the same time or sequentially. For example, stripes of one adhesive composition can be deposited on a substrate with longitudinal gaps between them, and then stripes of a different adhesive composition deposited on the substrate within those gaps. Alternatively, a dispensing head may have a configuration to deposit both adhesives simultaneously onto the substrate.

Once the process is complete, it is preferable for stripes of adhesive to abut each neighboring stripe to form a continuous adhesive layer. It is understood however that minor spaces between stripes can be tolerated without unduly impacting adhesive performance.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

Test Methods

Opening Mode Fracture Toughness

Fracture Strength in Cleavage of Adhesives in Bonded Metal Joints ($G_{Ic}$)—Opening Mode Fracture Toughness was measured in accordance with the method described in ASTM D3433-99 (Reapproved 2012). Eight 20.32 cm (8 inch) by 2.54 cm (1 inch) samples were cut from each bonded panel. Each data point is an average of two specimens tested at one of four temperatures: −55° C. (−67° F.), 24° C. (75° F.), 82° C. (180° F.), and 121° C. (250° F.). Substrates: 2024T3 bare aluminum panels of 228.6 mm by 228.6 mm by 9.95 mm were used to generate all data for all examples for Opening Mode Fracture Toughness. Panels were obtained from Erickson Metals of Coon Rapids, Minn. United States. Test results are reported in units of $J/m^2$.

Overlap Shear (OLS) Test

Primed panels of 2024-T3 bare aluminum measuring 4 inches long by 7 inches wide by 0.063 inches thick (10.16 by 17.78 by 0.16 centimeters) were prepared for testing as described in the section entitled "FPL Etched and Phosphoric Acid Anodized Aluminum Substrates Preparation." The primed panels were bonded to one another in an overlapping relationship along their lengthwise dimension using a 15.9 mm wide strip of adhesive film for CE 1 and 2 or constructed as described in EX 1 through 5. After removing the liner from one side, the scrim-supported film was applied to the first adherend by hand using a small rubber roller in such a manner as to exclude entrapped air and insure intimate contact between the exposed adhesive and the substrate. After removing the second liner, the second adherend was placed in contact with the exposed adhesive surface to give an assembly with an overlap area of 0.5 inches (12.7 mm). The resulting assembly was fastened together using tape and cured in an autoclave in one of the cure cycles described above. The bonded panels were sawn across their width into 1 inch (2.54 cm) wide strips and evaluated for overlap shear strength in accordance with ASTM D-1002 using a grip separation rate of 0.05 inches/minute (1.3 millimeters/minute) using a tensile tester. Each data point listed is an average of 6 specimens tested at one of six temperatures: −55° C. (−67° F.), 24° C. (75° F.), 82° C. (180° F.), 121° C. (250° F.), 136° C. (277° F.), and 177° C. (350° F.). Test results are reported in units of MPa and psi.

Floating Roller Peel (FRP) Strength Test for Adhesive Film

Primed panels of 2024-T3 bare aluminum measuring 8 inches long by 3 inches wide by 0.063 inches thick (20.3 by 7.6 by 0.16 centimeters), and 10 inches long times 3 inches wide times 0.025 inches thick (25.4 by 7.6 by 0.064 centimeters), were prepared for testing as described in the section entitled "FPL Etched and Phosphoric Acid Anodized Aluminum Substrate." The primed panels were bonded together using the same film adhesive and cure cycle employed for the overlap shear samples, then evaluated for floating roller peel strength in accordance with ASTM D-3167-76 with the following modification. Test strips measuring 0.5 inch (2.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch.

FPL Etched and Phosphoric Acid Anodized Aluminum Substrates Preparation

The aluminum panels underwent treatment before bonding. They panels were first soaked for ten minutes in an Oakite 165 caustic wash solution, available from Chemetall GmbH (Germany), at a temperature of 85 degrees Celsius (° C.) (185 degrees Fahrenheit (° F.)). The panels (in a rack) were submerged in a tank of tap water for ten minutes and spray rinsed with tap water for two to three minutes after removal from the tank of tap water. They panels were then soaked in a tank of FPL etch (a hot solution of sulfuric acid and sodium dichromate available from Forest Products Laboratory (FPL) of Madison, Wisc. United States) at 66° C. (151° F.) for ten minutes and spray rinsed with tap water for two to three minutes after removal from the tank of FPL etch. Next, they were air dried for ten minutes at ambient temperature and then dried further for thirty minutes in a re-circulating air oven at 54° C. (129° C.).

In all cases, the panels were further treated as follows. The etched panels were anodized by immersion in phosphoric acid at 22° C. (72° F.) with an applied voltage of 15 Volts for twenty to twenty-five minutes, followed by rinsing with tap water (test for water break), air drying for ten minutes at room temperature, then oven drying in a forced air oven at 66° C. (151° F.) for ten minutes. The resulting anodized aluminum panels were immediately primed within 24 hours of treatment. The anodized panels were primed with a corrosion inhibiting primer for aluminum (3M. Scotch-Weld™ Structural Adhesive Primer EW-5000, available from 3M, St. Paul, Minn.) according to the manufacturer's instructions to give a dried primer thickness of between 2.6 to 5.2 micrometers (0.00010 and 0.00020 inches).

Autoclave Adhesive Cure

All adhesively joined substrates were laid up in a typical vacuum bag to facilitate autoclave curing. After applying a vacuum to reduce the pressure to about 94.8 kPa (13.7 psi), an external pressure about 310 kPa (45 psi) was applied and the temperature of the autoclave was heated from about room temperature (22° C. (72° F.)) to either 121° C. (250°

F.) or 177° C. (350° F.), depending on the particular adhesive film employed, at a rate of 2.5° C./minute (4.5° F./minute). The vacuum was released when the pressure reached about 103.4 kPa (15 psi). The final temperature and pressure were maintained for 90 minutes before cooling to room temperature at a rate of 2.8° C./minute (5° F./minute) at which point the pressure was released and a cured joined structure was obtained.

Example 1 (EX1)

Figure 6:
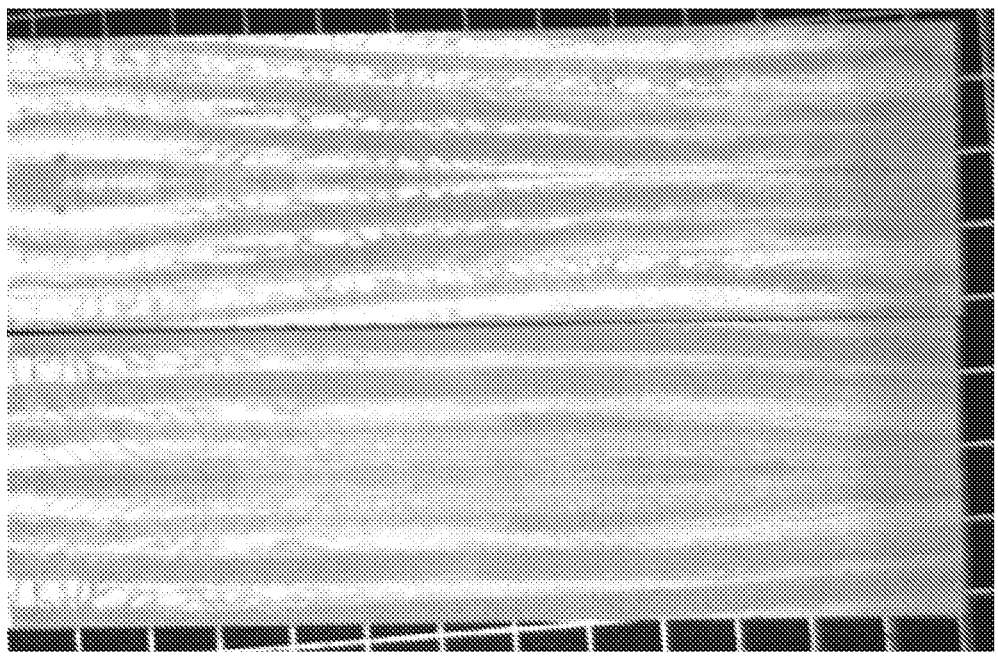
FIGS. 6-8 are photographs showing adhesive articles according to various embodiments that are described in forthcoming Examples.

3M™ Scotch-Weld™ Structural Adhesive Film AF 500M 0.06 (obtained from 3M Company, St. Paul, Minn.) and 3M™ Scotch-Weld™ Structural Adhesive Film AF 555M 0.05 (obtained from 3M Company) were hand laid in a vertical pattern onto an etched and anodized aluminum panel in alternating 0.3175 cm (0.125 inch) wide stripes as shown in FIG. 6 per appropriate layup configuration for Opening Mode Fracture Toughness testing, Overlap Shear (OLS) testing or floating roller peel (FRP) testing. The laid-up panels were cured until bond lines were formed. The samples underwent Opening Mode Fracture Toughness, OLS, and FRP testing and the results are reported in Tables 1, 2, and 3.

Example 2 (EX2)

Figure 7:
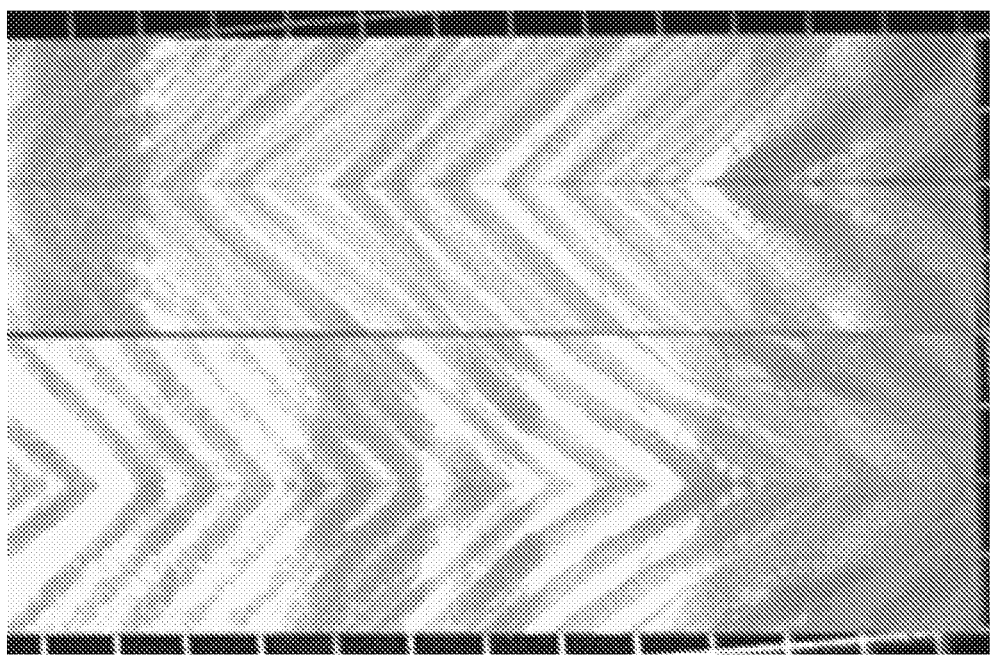

3M™ Scotch-Weld™ Structural Adhesive Film AF 500M 0.06 and 3M™ Scotch-Weld™ Structural Adhesive Film AF 555M 0.05 were hand laid in a diagonal pattern onto an etched and anodized aluminum panel in alternating 0.3175 cm 0.125 inch) wide stripes as shown in FIG. 7. The laid-up panel was cured until bond lines were formed. The samples underwent Opening Mode Fracture Toughness testing and the results are reported in Table 1.

Example 3 (EX3)

Figure 8:
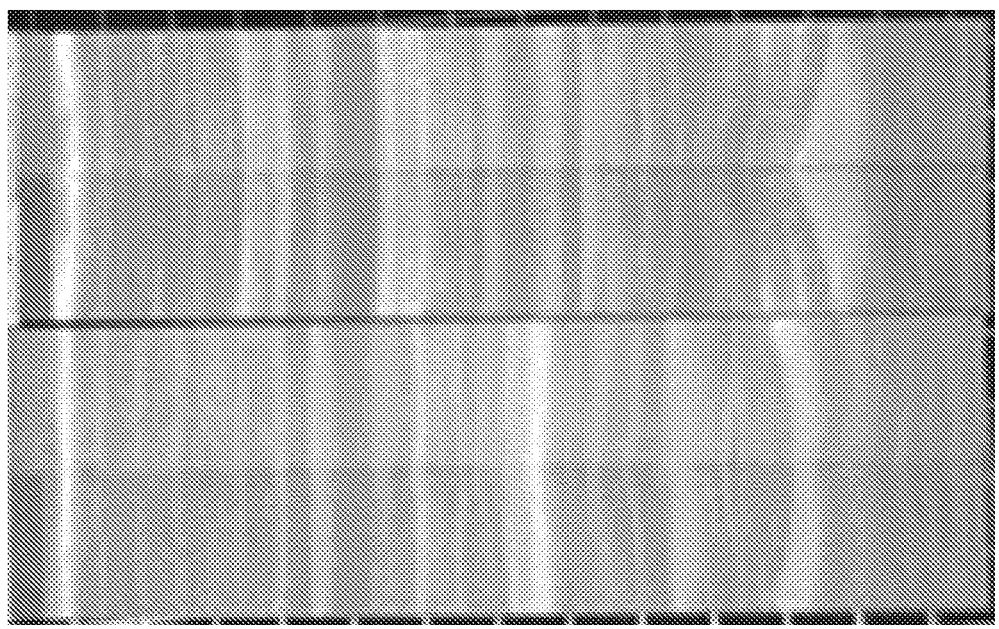

3M™ Scotch-Weld™ Structural Adhesive Film AF 500M 0.06 and 3M™ Scotch-Weld™ Structural Adhesive Film AF 555M 0.05 were hand laid in a transverse pattern onto an etched and anodized aluminum panel in alternating 0.3175 cm (0.125 inch) wide stripes as shown in FIG. 8. The laid-up panel was cured until bond lines were formed. Eight 20.32 cm (8 inch)×2.54 cm (1 inch) samples were cut. The samples underwent Opening Mode Fracture Toughness, OLS, and FRP testing and the results are reported in Tables 1, 2, and 3.

Example 4 (EX4)

Figure 11:
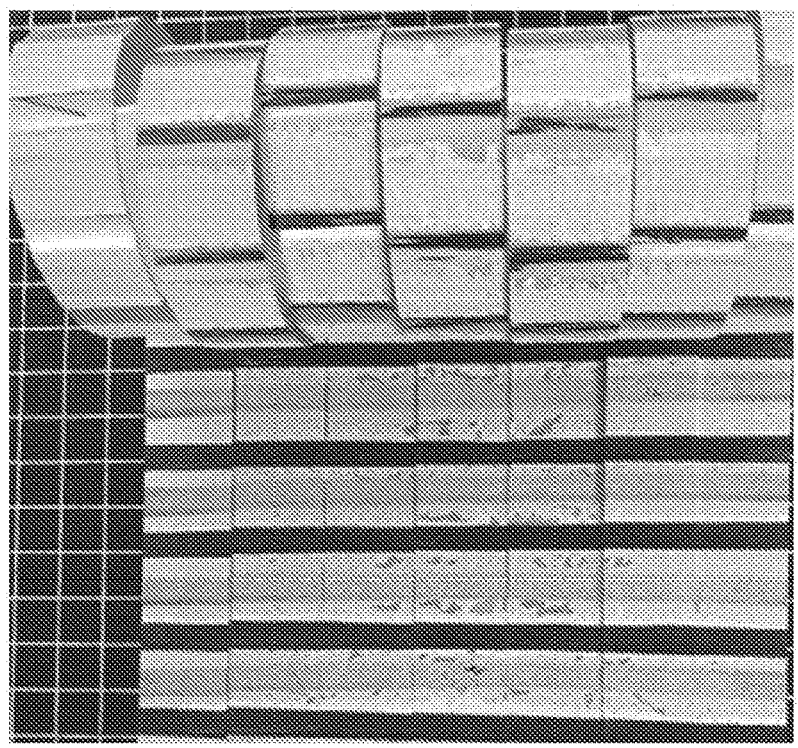
FIGS. 11 and 12 are photographs showing adhesive articles according to additional embodiments that are described in the forthcoming Examples.

0.635 cm (0.25 in) wide tows of Pyrofil™ TR50S 12L PAN-based carbon fibers (obtained from Mitsubishi Rayon Company of Tokyo, Japan) were placed on both surfaces of 3M™ Scotch-Weld™ Structural Adhesive Film AF 500M 0.06 in alternating fashion with the gaps between tows at 1.27 cm (0.5 inch) in horizontal pattern. Horizontal patterns mean carbon fiber tows are oriented lengthwise perpendicular to the peel direction. Alternating fashion means tows were not spatially overlapping on the opposite surfaces of the adhesive film. FIG. 11 shows the layup of EX4. The darkest horizontal lines indicate the carbon fiber tows on the top side of the film adhesive. Moving vertically from the dark carbon tow, a stripe of the lightest color is represented and highlights the film adhesive only. Progressing vertically, a lighter gray line positioned between the darkest lines is apparent, which indicates the carbon fiber tow on the backside of the film adhesive. Continuing to progress vertically in the image, another layer of the lightest color represents the film adhesive only. The pattern repeats many times in the length of the sample. The samples underwent FRP testing and the results are reported in Table 3.

Example 5 (EX5)

Figure 12:
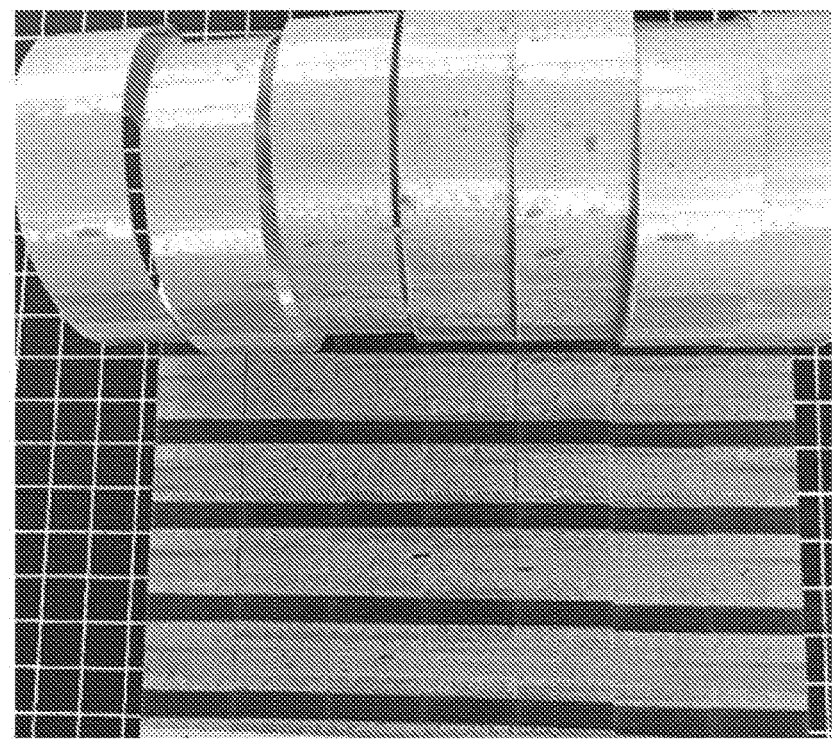

0.635 cm (0.25 in) wide tows of Pyrofil™ TR50S 12L PAN-based carbon fibers were placed on both surfaces of 3M™ Scotch-Weld™ Structural Adhesive Film AF 555M 0.05 in alternating fashion with the gaps between tows at 1.27 cm (0.5 inch) in horizontal pattern. Horizontal patterns mean carbon fiber tows are oriented lengthwise perpendicular to the peel direction. Alternating fashion means tows were not spatially overlapping on the opposite surfaces of the adhesive film. FIG. 12 shows the layup of EX5, which has features analogous to those shown of EX4 in FIG. 11. The samples underwent FRP testing and the results are reported in Table 3.

Comparative Example 1 (CE1)

Figure 9:
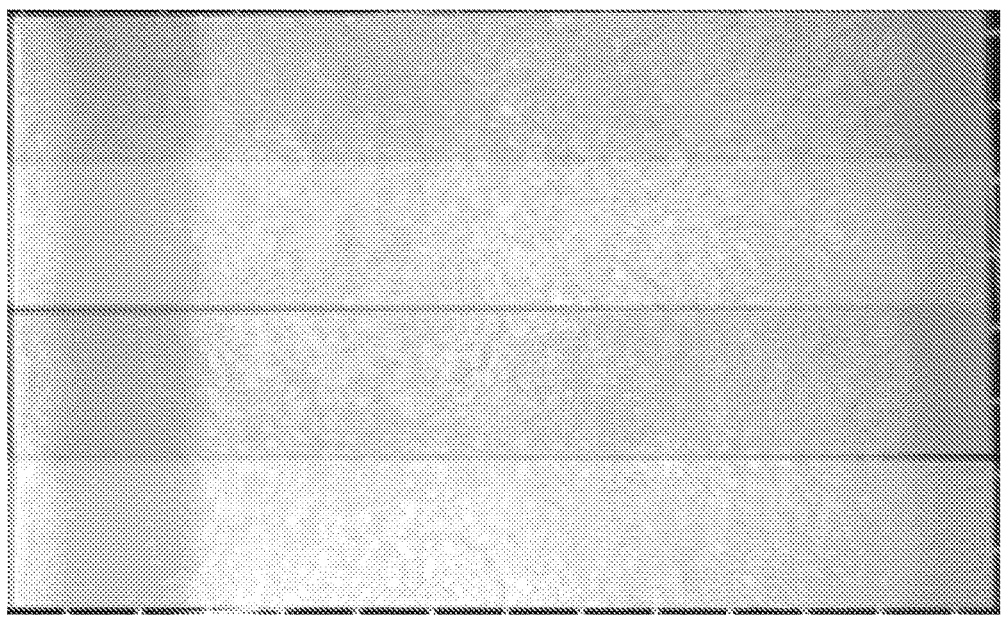
FIGS. 9 and 10 are photographs showing adhesive articles based on prior art constructions that are described in the forthcoming Examples.

3M™ Scotch-Weld™ Structural Adhesive Film AF 500M 0.06 was hand laid in a vertical pattern onto an etched and anodized aluminum panel in alternating 3.81 cm (1.5 inch) wide stripes as shown in FIG. 9. The laid-up panel was cured until bond lines were formed. Eight 20.32 cm (8 inch)×2.54 cm (1 inch) samples were cut. The samples underwent Opening Mode Fracture Toughness, OLS, and FRP testing and the results are reported in Tables 1, 2, and 3.

Comparative Example 2 (CE2)

Figure 10:

3M™ Scotch-Weld™ Structural Adhesive Film AF 555M 0.05 was hand laid in a vertical pattern onto an etched and anodized aluminum panel in alternating 3.81 cm (1.5 inch) wide stripes as shown in FIG. 10. The laid-up panel was until bond lines were formed. Eight 20.32 cm (8 inch)×2.54 cm (1 inch) samples were cut. The samples underwent Opening Mode Fracture Toughness, OLS, and FRP testing and the results are reported in Tables 1, 2, and 3.

TABLE 1

Opening Mode Fracture Toughness Test Results ($J/m^2$)

| | Temperature | | | |
|---|---|---|---|---|
| | −55° C. (−67° F.) | 24° C. (75° F.) | 82° C. (180° F.) | 121° C. (250° F.) |
| EX1 | 2394 | 2561 | 2433 | 2233 |
| EX2 | 2383 | 2641 | 2570 | 2351 |
| EX3 | 2497 | 2432 | 2576 | 2309 |
| CE1 | 2548 | 3461 | 1894 | 1243 |
| CE2 | 1686 | 2673 | 2864 | 2594 |

TABLE 2

Overlap Shear Test Results (MPa (psi))

| | Temperature | | | | | |
|---|---|---|---|---|---|---|
| | −55° C. (−67° F.) | 24° C. (75° F.) | 82° C. (180° F.) | 121° C. (250° F.) | 136° C. (277° F.) | 177° C. (350° F.) |
| EX1 | 30.4 (4409) | 37.2 (5395) | DNT | 8.0 (1160) | DNT | DNT |

TABLE 2-continued

Overlap Shear Test Results (MPa (psi))

| | Temperature | | | | | |
|---|---|---|---|---|---|---|
| | −55° C. (−67° F.) | 24° C. (75° F.) | 82° C. (180° F.) | 121° C. (250° F.) | 136° C. (277° F.) | 177° C. (350° F.) |
| EX3 | 42.6 (6179) | 37.8 (5482) | DNT | 12.5 (1813) | DNT | DNT |
| CE1 | 44 (6382) | 42 (6092) | 31 (4496) | 16 (2321) | DNT | DNT |
| CE2 | 33 (4786) | 39 (5656) | DNT | DNT | 21 (3046) | 11 (1595) |

DNT = Did Not Test

TABLE 3

Floating Roller Peel Test Results (N/25 mm)

| | Temperature 24° C. (75° F.) |
|---|---|
| EX1 | 210 |
| EX3 | 178 |
| EX4 | 226 |
| EX5 | 89 |
| CE1 | 240 |
| CE2 | 120 |

If a graphical representation of the FRP peel force versus the tested length of the sample is constructed, the results fell into two categories. EX1, CE1 and CE2 all showed a peel strength which is quite constant around a mean value as a function of peel distance. By contrast, EX3, EX4 and EX5 showed a peel force versus distance graph which consisted of systematic peaks and valleys deviating significantly from the mean value and corresponding to the spatial location and presence and/or absence of fibers in the bond. While the peel strength averages in Table 3 of EX4 and CE1, and EX5 and CE2 are fairly similar, and EX3 is similar to the average of CE1 and CE2, the nature of the peel strength versus distance is fundamentally different between the comparative examples and those containing fiber tows or patterns in transverse orientations to peel forces.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An adhesive article comprising:
a first patterned adhesive layer comprising first and second adhesives that are compositionally and spatially distinct, and laterally disposed relative to each other within the first patterned adhesive layer, wherein the first patterned adhesive layer has at least one exposed major surface that is tacky at ambient temperature; and
one or more release liners disposed on one or both exposed major surfaces,
wherein the first and second adhesives are each structural adhesives capable of being functionally cured to provide, collectively, a structural adhesive bond with a substrate.

2. The adhesive article of claim 1, wherein each of the first and second adhesives is capable of being functionally cured to provide a structural adhesive bond with the substrate.

3. An adhesive article comprising:
a first patterned adhesive layer comprising first and second adhesives that are compositionally and spatially distinct, and laterally disposed relative to each other within the first patterned adhesive layer; and
a second patterned adhesive layer disposed on the first patterned adhesive layer and comprising third and fourth adhesives that are compositionally and spatially distinct, and laterally disposed relative to each other within the second patterned adhesive layer,
wherein first and second patterned adhesive layers have respective patterns that do not substantially coincide with each other when viewed from a direction perpendicular to the first and second patterned adhesive layers.

4. The adhesive article of claim 3, wherein the third and fourth adhesives have the same compositions as the first and second adhesives, respectively.

5. The adhesive article of claim 3, wherein the first and/or second adhesives are capable of being functionally cured to provide, collectively, a structural adhesive bond with a substrate.

6. The adhesive article of claim 3, wherein the third and/or fourth adhesives are capable of being functionally cured to provide a structural adhesive bond with a substrate.

7. The adhesive article of claim 1, further comprising a continuous adhesive layer disposed on the first patterned adhesive layer, wherein the continuous adhesive layer comprises either the first or second adhesive.

8. The adhesive article of claim 1, wherein the first adhesive displays a fracture energy when functionally cured that is substantially different from that of the second adhesive over temperatures from −55?C to 121?C based on ASTM D3433-00 (2012).

9. The adhesive article of claim 1, wherein the first and second adhesives are arranged according to a stripe pattern.

10. The adhesive article of claim 1, wherein the first adhesive displays a fracture strength greater than that of the second adhesive at −55?C and the second adhesive displays a fracture strength greater than that of the first adhesive at 121?C, based on ASTM D3433-00 (2012).

11. The adhesive article of claim 1, wherein the first adhesive has a storage modulus when functionally cured, as measured on a dynamic mechanical analyzer at 25?C, amplitude of 15 micrometers, and frequency of 1 Hz, that is substantially different from that of the second adhesive.

12. The adhesive article of claim 1, wherein the first adhesive has a glass transition temperature when functionally cured that is substantially different from that of the second adhesive when functionally cured.

13. The adhesive article of claim 1, wherein the first and second adhesives are thermally curable and further wherein the first adhesive has a peak exotherm temperature as measured by differential scanning calorimetry that is substantially different from that of the second adhesive.

* * * * *

UNITED STATES PATENT AND TRADEMARK OFFICE
CERTIFICATE OF CORRECTION

PATENT NO. : 12,180,396 B2
APPLICATION NO. : 17/638534
DATED : December 31, 2024
INVENTOR(S) : Dmitriy Salnikov et al.

Page 1 of 1

It is certified that error appears in the above-identified patent and that said Letters Patent is hereby corrected as shown below:

In the Claims

<u>Column 14</u>

Line 40, In Claim 8, delete "from -55?C to 121?C" and insert -- from -55° C. to 121° C. --, therefor.

Line 46, In Claim 10, delete "adhesive at -55?C" and insert -- adhesive at -55° C. --, therefor.

Line 47-48, In Claim 10, delete "adhesive at 121?C" and insert -- adhesive at 121° C. --, therefor.

Line 51, In Claim 11, delete "analyzer at 25?C" and insert -- analyzer at 25° C. --, therefor.

Signed and Sealed this
Twenty-ninth Day of April, 2025

Coke Morgan Stewart
*Acting Director of the United States Patent and Trademark Office*